United States Patent
Strutynsky

(10) Patent No.: US 9,708,791 B2
(45) Date of Patent: Jul. 18, 2017

(54) APPARATUS, SYSTEMS AND METHODS FOR EXCAVATING TRENCHES IN EARTH OR SOIL AND INSTALLING UNDERGROUND CONDUITS OR OTHER MEDIA

(71) Applicant: Andrew Strutynsky, Hillpoint, WI (US)

(72) Inventor: Andrew Strutynsky, Hillpoint, WI (US)

(*) Notice: Subject to any disclaimer, the term of this patent is extended or adjusted under 35 U.S.C. 154(b) by 98 days.

(21) Appl. No.: 14/516,213

(22) Filed: Oct. 16, 2014

(65) Prior Publication Data

US 2016/0108606 A1    Apr. 21, 2016

(51) Int. Cl.

| | |
|---|---|
| *E02F 5/18* | (2006.01) |
| *F16L 1/032* | (2006.01) |
| *E02F 5/12* | (2006.01) |
| *E02F 3/06* | (2006.01) |
| *E02F 3/90* | (2006.01) |
| *E02F 3/92* | (2006.01) |
| *E02F 5/10* | (2006.01) |
| *E02F 5/14* | (2006.01) |
| *F16L 1/06* | (2006.01) |

(52) U.S. Cl.
CPC .................. *E02F 5/18* (2013.01); *E02F 3/06* (2013.01); *E02F 3/907* (2013.01); *E02F 3/9231* (2013.01); *E02F 5/101* (2013.01); *E02F 5/103* (2013.01); *E02F 5/12* (2013.01); *E02F 5/145* (2013.01); *F16L 1/032* (2013.01); *F16L 1/06* (2013.01)

(58) Field of Classification Search
CPC ....... E02F 5/04; E02F 5/08; E02F 5/10; E02F 5/12; E02F 5/102; E02F 5/103; E02F 5/109; E02F 5/18; E02F 5/101; E02F 5/145; E02F 3/06; E02F 3/907; E02F 3/9231; F16L 1/06; F16L 1/032
See application file for complete search history.

(56) References Cited

U.S. PATENT DOCUMENTS

| | | | | |
|---|---|---|---|---|
| 330,724 | A | | 11/1885 | Montgomery |
| 333,114 | A | * | 12/1885 | Dougine .................... E02F 5/12 37/355 |
| 1,006,116 | A | | 10/1911 | Morse |
| 1,303,399 | A | * | 5/1919 | Ryan ....................... F16L 1/038 37/357 |
| 1,337,184 | A | * | 4/1920 | Adams ..................... H02G 1/06 37/350 |
| 1,814,094 | A | * | 7/1931 | Rhodes ..................... E02F 5/08 37/142.5 |
| 2,118,553 | A | * | 5/1938 | Garlinger ................ E02F 5/102 172/170 |
| 2,900,931 | A | | 8/1959 | Lisle |

(Continued)

*Primary Examiner* — Jamie L McGowan
(74) *Attorney, Agent, or Firm* — Dinsmore & Shohl LLP

(57) ABSTRACT

Apparatuses, systems and methods are provided for cutting a trench in soil or earth by driving a cutter tube member through the soil or earth, injecting compressed fluid into the tube member to break up the soil and drive it through the tube member along the flow of compressed fluid, imparting dynamic vibrational forces to the tube member to assist the flow of soil therethrough, ejecting the soil from the tube member, guiding and releasing media and/or filler material into the trench, and backfilling the trench with the ejected soil.

22 Claims, 9 Drawing Sheets

(56) References Cited

U.S. PATENT DOCUMENTS

| | | | | |
|---|---|---|---|---|
| 3,120,107 A * | 2/1964 | Juusela | E02F 5/101 | 405/156 |
| 3,140,745 A * | 7/1964 | Pope | A01B 13/08 | 172/256 |
| 3,256,695 A * | 6/1966 | Bodine, Jr. | E02F 5/10 | 172/40 |
| 3,349,568 A | 10/1967 | Smith et al. | | |
| 3,400,542 A | 9/1968 | Davis | | |
| 3,420,317 A * | 1/1969 | Ryan | E02F 5/04 | 172/699 |
| 3,563,045 A * | 2/1971 | Hansen | E02F 5/103 | 172/108 |
| 3,604,215 A * | 9/1971 | Dunn | H02G 1/06 | 405/155 |
| 3,706,207 A * | 12/1972 | Cornelius | E02F 5/103 | 172/40 |
| 3,777,500 A * | 12/1973 | Kelley | E02F 5/103 | 172/101 |
| 3,859,809 A * | 1/1975 | Clayhold | E02F 5/102 | 405/179 |
| 3,903,624 A * | 9/1975 | Holl | E02D 17/086 | 175/393 |
| 4,200,410 A * | 4/1980 | Baker | E02F 5/103 | 172/40 |
| 4,397,585 A * | 8/1983 | Fouss | H02G 1/06 | 405/174 |
| 4,430,812 A * | 2/1984 | Van der Ent | B65G 19/14 | 198/520 |
| 4,437,789 A | 3/1984 | Kasiewicz | | |
| 4,454,921 A * | 6/1984 | Schlicker, Jr. | E02F 9/28 | 172/699 |
| 4,537,531 A * | 8/1985 | Diefenthaler | E02F 5/08 | 405/156 |
| 4,588,034 A * | 5/1986 | Leonard | E02F 5/103 | 172/40 |
| 4,629,363 A * | 12/1986 | Rose | E02F 5/101 | 405/155 |
| 4,637,755 A * | 1/1987 | Tollefson | E02F 5/102 | 405/174 |
| 4,652,176 A * | 3/1987 | Leonard | E02F 5/103 | 172/40 |
| 4,830,537 A * | 5/1989 | Munro | E02F 5/12 | 405/155 |
| 4,871,281 A * | 10/1989 | Justice | E02F 3/10 | 37/353 |
| 4,877,355 A * | 10/1989 | Van Pelt | E02F 5/104 | 405/158 |
| 5,059,064 A * | 10/1991 | Justice | E02B 11/00 | 239/20 |
| 5,701,692 A * | 12/1997 | Woodall | E02F 5/12 | 37/142.5 |
| 6,189,244 B1 * | 2/2001 | Johnson | E02F 5/06 | 37/349 |
| 6,193,440 B1 * | 2/2001 | Pidgeon | E02F 5/06 | 37/106 |
| 6,299,381 B1 * | 10/2001 | Liebrecht, Jr. | E02F 3/06 | 37/350 |
| 6,810,609 B2 * | 11/2004 | Lassonde | E01H 4/02 | 172/123 |
| 2012/0099929 A1 * | 4/2012 | Baber | E02F 3/962 | 405/184.4 |
| 2015/0284932 A1 * | 10/2015 | Johnson | E02F 3/961 | 405/174 |

* cited by examiner

APPARATUS, SYSTEMS AND METHODS FOR EXCAVATING TRENCHES IN EARTH OR SOIL AND INSTALLING UNDERGROUND CONDUITS OR OTHER MEDIA

TECHNICAL FIELD

The present application relates to methods, systems and apparatuses for excavating trenches in earth or soil and depositing conduits or other media therein (e.g., for agricultural field drainage, irrigation, power, communications, etc.).

BACKGROUND

Trenches are cut in soil or earth for various purposes. These include, among others, laying underground media such as, for example, drain tile or utility conduits. Drain tile, also known as "weeping tile," among other names, is perforated piping installed underground and often immersed in a bed of stone, to transport water as part of an irrigation system, or to provide subterranean drainage and keep water from pooling in flat or low lying areas. Utility conduits provide a protected subterranean path for power and communication lines.

Trench-cutting devices perform a significant labor-saving function, with the potential for more efficient, precise and consistent results than cutting trenches by hand, or by using non-purpose-built machinery such as backhoes. Such complex devices may have high power requirements to cut and excavate soil, and may incorporate numerous heavy-duty moving parts, which may also need lubrication. For obvious reasons, such trench-cutting devices may incorporate a fortified, or heavy-duty cutting member, as well as a powerful drive mechanism, to advance and cut trenches in soil of high or variable density.

After a trench is cut, media may be fed into the open trench. This may be done by hand or through the use of feeder devices, which may be integrated with a trench-cutting device. While it is not always required, adding a backfill material to the trench may optimize the performance of the media by protecting it, or facilitating fluid flow to or away from the media, for example. This may require precise and specific positioning of the backfill material and media, or their arrangement in a particular configuration or relationship. However, ensuring that the backfill material is properly deposited into the trench in a desired relationship with the deposited media, for the intended performance or protection of the media, may require additional equipment or labor and inspection while the media is being laid in the trench, or before refilling the trench. Indeed, the performance of such labor or inspection before re-filling the trench may be labor- and time-intensive.

To provide the capability for cutting trenches in various types of soil and over long distances (for example, large-scale agricultural fields and wind farm installations), trench-cutting devices often approach the size, weight and cost of large farming vehicles or construction equipment.

SUMMARY

A trench-cutting device described in connection with embodiments herein may be referred to herein as a "cutter tube trencher." In embodiments discussed in this application, the efficiency and efficacy of trench-cutting operations and equipment may be improved by forcing a cutter tube member having a soil intake into and through soil or earth, and injecting compressed air (or other fluids) into the cutter tube member as soil flows through it, in order to fluidize the soil and assist the soil flow through the cutter tube member, and the soil's expulsion therefrom. Although many configurations are possible, embodiments of the cutter tube member may have an intake section into which the soil enters, and an ejector section that extends upwardly from the intake section, forming an approximate "L" shape in example embodiments, with a top end that may extend above the surface of the soil. This configuration may form a tubular passage, which may be continuous, through the intake and ejector sections. Thus, when the cutter tube member is forced through the soil or earth, soil enters an intake opening at the leading end of the intake section, flows through the intake section to the ejector section as the cutter tube member advances through soil, and is finally expelled from one or more ejector ports of the ejector section. A trench or void, which may be elongated, is produced or left in the soil or earth as a result.

A stream of compressed fluid, such as air, for example, may be directed or injected directly into the cutter tube member as soil enters the intake opening and passes through the tubular passage. The compressed fluid stream may further break up the soil, partially or fully fluidize the soil particles within the cutter tube member, and impel the soil to flow through and ultimately out of the cutter tube member. The flow of soil toward the ejector port is at least partially caused, and reverse flow is prevented, by the forward motion of the cutter tube member as it encounters intact soil structure ahead of the cutter tube member intake opening.

Trench-cutting processes and apparatuses described in connection with embodiments may enhance trench-cutting operations and improve the performance of drain tile. For example, such cutter tube trenchers may virtually eliminate soil densification and compaction, because as soil flows through the cutter tube member it is excavated and removed, rather than being forcefully divided, separated and compacted, as may be caused by large-scale, heavy-duty plow-like trenching devices. It is more difficult for water to flow or drain through compacted soil. By reducing or eliminating soil compaction around drain tile, water can flow toward or away from it more easily, thus enhancing the drainage or irrigation function of the drain tile. In addition, cutter tube trenching operations and apparatuses such as those described in accordance with embodiments may require less power to advance through soil because a hollow cutter tube exhibits less resistance than a solid plow-like member. Due to the reduction in force needed to drive such cutter tube trenchers through soil, enhanced durability and reduction in the frequency of mechanical breakdowns, or their elimination altogether, may result.

If desired, embodiments of a cutter tube trencher described herein may employ individual components that are smaller, or a lighter-duty character. Because of the reduced operational force needed to advance a low-resistance cutter tube trencher passage through soil, components may be optimized for reduced wear-and-tear. A compact design package or envelope may characterize embodiments of such cutter tube trenchers, resulting in improved maneuverability and ease-of-use, especially for smaller-scale operations or in tight quarters. Compact or smaller-scale cutter tube trenchers may also cost less and require less power, thus making them more affordable to own and operate for individual farmers and others with recurring or small-scale trenching needs. As a result, the cost of such a cutter tube trencher may be competitive and even advantageous in comparison with hiring a contractor or renting large-scale equipment for trenching, particularly for periodic, seasonal or otherwise occasional trench-cutting operations.

Embodiments may be configured to be pushed, pulled or otherwise driven through earth or soil by multi-use motive equipment such as, for example, tractors, bulldozers, or other types of farm or construction equipment, including those of small or medium size, which many farmers or construction contractors may already own.

For ease of attachment to tractors or other equipment, and for controlling a cutter tube trencher, embodiments may, for example, optionally include standardized or non-standardized couplings, ports or other connection apparatus. In example embodiments, connection apparatus may incorporate a standardized three-point agricultural hitch mount, and may further include mechanical or hydraulic adjusters for controlling the depth of the cutter tube trencher below the surface of the soil, as well as the attitude of the cutter tube trencher in relation to the earth. In addition, embodiments may optionally be configured with interfaces for connection to so-called "power take offs," i.e., standardized power and connection units that are often fitted to tractors and other farm and construction equipment. Such power take-offs may provide power transmission to a connected cutter tube trencher for driving and powering the cutter tube trencher and the various cutter tube trencher components or accessories that may be attached or incorporated into a cutter tube trencher. Examples of the types of accessories that may be incorporated into cutter tube trenchers will be discussed in greater detail, below. In embodiments, cutter tube trenchers may also optionally include integrated compressors or other types of power units, such as generators or other electrical power packs, for powering cutter tube trencher components and accessories. Further, rather than being attached to and driven by separate motive equipment, embodiments may also be configured as self-propelled cutter tube trenchers, with integrated motive drive features and components, which may also directly provide power for ancillary trencher accessories and functions, or drive generators, air compressors or other power units for indirectly powering such ancillary accessories and functions.

In embodiments, a vibration-generating device, or shaker, may be affixed or connected to the cutter tube member to induce vibration when powered, thus imparting a dynamic force to enhance the break-up of soil entering the cutter tube member, encouraging the soil to fluidize and flow more easily therethrough. The vibration-generating device, as well as other components and accessories described in connection with embodiments, may be powered in various ways, such as by compressed air or by hydraulic or electric power that is derived from a piece of motive equipment driving the cutter tube trencher (e.g., a tractor). Power for the shaker may alternately be provided from an integrated compressor or power unit as discussed above. The energy or vibrations imparted to the cutter tube trencher may also help clear or dislodge obstacles such as rocks, and to prevent clogs within the cutter tube member due to heavy clay-like soils.

Optionally, in embodiments, compressed air at one pressure may be directed into the cutter tube member to facilitate the flow of soil as discussed above, and a separate stream of compressed air at the same or different pressure may be used to power the vibration-generating device and other accessories. Moreover, compressed air exhaust from a vibration generator, and other ancillary cutter tube trencher accessories or components may be routed into the tube member to provide supplementary fluid volume to assist in breaking up the soil and helping the soil flow through the cutter tube member. If desired, particular embodiments may employ compressed air plumbing systems, or arrangements of multiple compressors, to generate and deliver compressed air (or other fluids) at the same or different pressures for breaking up soil that enters the cutter tube member, for other particulate flow functions, and for powering other components of cutter tube trencher devices. Of course, fluids other than air may be plumbed to the cutter tube trencher for such purposes.

Embodiments of a cutter tube trencher may also optionally incorporate a device to break-up earth or soil ahead of the cutter tube member, in order to ease the entry and flow of earth into and through the cutter tube member. This is often useful when cutting trenches in wet or clay-like soil. For example, particular embodiments of the cutter tube trencher may employ a guard member at the intake of the cutter tube member to break up soil as it enters the intake, and to keep large rocks and other non-soil debris from entering the cutter tube member and possibly clogging it.

Embodiments may also optionally incorporate a short plow blade above the cutter tube member intake section in front of the ejector section. The plow blade may widen from a tapered leading edge, so as to cut into and gradually open the soil above the intake section as the cutter tube trencher advances through soil. As an example, the plow blade may widen from a tapered edge to slightly wider than the width of the ejector section, like a wedge. The gradual widening of the cutter blade ahead of the ejector section allows the ejector section to pass through the soil with less resistance.

Furthermore, particular example embodiments may include a deflector at the top of the ejector section, to direct the expelled soil in a lateral or downward direction. The ejected soil can thus be deposited on either or both sides of a freshly cut trench, for ease of refilling or covering the trench. If desired, in embodiments, refilling the trench may be facilitated by a trailing scraper incorporated into or connected to embodiments of the cutter tube trencher, or affixed to a trailer or wagon that advances with the cutter tube trencher.

In addition, embodiments may optionally incorporate multiple rotary auger devices within the cutter tube member. Rotating helical-like augers may cleave and break up soil that may be difficult to fluidize, such as waterlogged or heavy, plastic clay-like soil, for example. The mechanical action of the auger devices also forces or drives soil through the cutter tube member. In example embodiments, the augers may operate independently, or in cooperation with the compressed air and vibration functions of the cutter tube trencher described above. Indeed, embodiments may include any or all of the compressed air, vibration or augers, in any combination, to break up, fluidize and move soil through the cutter tube member.

In trench cutting applications, maintaining a consistent or desired grade, depth or slope of trench may improve the effectiveness of field drainage. Accordingly, guidance and level-control devices or control systems may also be incorporated into embodiments of a cutter tube trencher, if desired, to maintain heading (direction of travel) and desired grade-level control of depth and "flatness" or incline of the trench being cut by the cutter tube trencher, among other items, as well as controlling various accessories and components of cutter tube trenching apparatus. Guidance and level-control devices and systems may provide for manual or automatic actuation and control of the cutter tube trencher, including one or both of a cutter tube member and injector boot, based on any type of input or control, such as, for example, radar, infrared, laser, inertial, gyroscopic, radio-wave, LORAN, location-based or Global Positioning System ("GPS"), with a central controller generating and issuing instructions and commands in response to inputs. Such input or control items may incorporate location-determining receivers or other sensor attached to the cutter tube trencher or cutter tube trenching apparatus. Inputs may also be pre-programmed, or issued to the controller via user interfaces.

As a cutter tube trencher is driven through earth and cuts a trench, continuous or discontinuous media may be deployed into the trench in various ways. For example, an integrated or supplementary injector device may receive and guide media (e.g., for communications, power transmission, irrigation or drainage, as discussed above) into a freshly cut trench as a cutter tube trencher advances. In embodiments, a hollow tubular injector boot, with one or more passage extending therethrough, may be attached to the ejector section of the cutter tube member, or otherwise connected to the cutter tube trencher or motive equipment driving the cutter tube trencher, so as to move with the cutter tube trencher as it is driven through the earth. The injector boot may include an exit leg that extends away from the ejector section of the cutter tube trencher, in the opposite direction that cutter tube trencher advances, for deployment of media or conduit into the trench. In embodiments, the overall structure may thus be of a substantially continuous media channel extending through a tubular injector boot, although the media channel may be of any consistent or variable shape or section. An entry leg of the injector boot may extend upwardly from the exit leg. The entry leg may optionally incorporate a feed port for receiving the media or conduit and guiding it into the injector boot passage. In example embodiments, the entry leg of the injector boot may extend upwardly above the soil surface so as to prevent soil from entering the feed port, and thus the injector boot, as the trench is being cut. Media may feed into the injector boot entry leg feed port, such as from a spool or reel, for example, and pass through the injector boot passage, to a discharge opening at the end of the exit leg that is opposite the entry leg. The media may release into the trench from the discharge opening.

Embodiments of the injector boot may also incorporate optional devices that provide for variability and adjustment of the height at which media releases into the trench. For example, adjustable roller guides mounted at or near the discharge opening of the exit leg may allow for the release and placement of media into the trench at variable depths. Similarly, in example embodiments, roller guides may be deployed at or near the entry leg feed port, to guide media into the entry leg at a particular attitude or angle, and avoid scraping potentially sharp edges of the feed port. Of course, such roller guides are not necessary, and other features may be integrated or incorporated into the entry leg feed port or exit leg discharge opening to guide the conduit or other media as it is fed into the entry leg or exits the discharge opening. For example, embodiments may include end caps, brackets and the like at or near the feed port or discharge opening, to shield the conduit or other media from sharp edges, provide a smooth surface along which the conduit or other media can slide, or provide adjustability or interchangeability for a particular desired entry angle or exit height/depth. Indeed, in embodiments, the feed port and discharge opening themselves may be smoothly finished, to act as guides and prevent damaging the conduit or other media.

Injector boot embodiments may also be configured to receive and discharge backfill material such as sand or gravel, for example, into a freshly-cut trench. The backfill material may be deposited by itself, or together with media, and the backfill material may partially or fully surround the media to protect it, facilitate fluid flow into or out of the media, or provide an insulating or conducting layer between media and the soil for various purposes. The simultaneous and automatic controlled addition of backfill material, particularly while controlling the height at which conduit or media is laid in a trench, as facilitated by embodiments, may allow for advantageous positioning and relationships between media and backfill material. Indeed, if desired, various combinations of more than one type of media and/or backfill material may be passed through the injector boot together, or separately, through one or multiple passages extending therethrough.

In embodiments, if desired, a separate vehicle, such as a dump or hopper truck, may advance with the cutter tube trencher and injector boot and feed backfill material into a hopper or other collector that is attached or incorporated into the feed port of the injector boot, for receiving and guiding the backfill material into the injector boot media channel. Alternately, a trailer or wagon following the cutter tube trencher and injector boot may include a receptacle (e.g., a bin) for carrying the backfill-material and feeding it into the injector boot. In embodiments, compressed or fan-blown air may be routed to the bin and/or the injector boot for conditioning (drying) the backfill material, fluidizing the backfill material, and forcing the backfill material to flow into the trench along with media being emplaced. In embodiments, the backfill material may optionally be gravity-fed from surface bins or hoppers, fan-blown from a pressurized hopper, or otherwise delivered to the injector boot.

In particular embodiments, optional guard plates may extend rearwardly from the injector boot along either side of the injector boot. The guard plates may prevent soil from collapsing into the trench when the cutter tube trencher is stopped for particular operations, such as when vertical extensions of conduit or drain tile extending toward the soil surface are being installed, for example.

If desired, particular embodiments of a cutter tube trencher may include any number of cutter tube members, injector boots and other associated components, arranged in various configurations, for efficiency in cutting several trenches at once. For example, two or more cutter tube members may be attached to a tractor or other driving machinery, in a side-by-side or staggered configuration, or over/under configurations for simultaneous cutting of multiple trenches co-laterally or co-vertically as the multiple cutter tube members of the cutter tube trencher are driven through soil or earth. The cutter tube members and injector boots may be arranged and configured so as to be controllable together, in unison, or for control of each cutter tube member independently of the others. Of course, cutter tube trenchers and injector boots according to embodiments may also be used independently of each other, or with other types of media/conduit feed mechanisms, cutter tube trenchers, motive equipment and other types of equipment.

As was briefly discussed above, control systems may optionally be integrated into embodiments to control functionality and positioning of cutter tube trenchers, associated motive equipment, and injector boots, as well as the various ancillary components, accessories and power sources operating with these items. Indeed, cutter tube trencher assemblies according to embodiments may incorporate various configurations of such items. Such control systems may provide for various levels of automation, from direct control by an operator inputting instructions via a user interface, to fully-automated systems that may incorporate controllers that receive pre-programmed instructions, inputs from a user interface, and/or inputs from sensors deployed on or throughout a cutter tube trencher, injector boot, or cutter tube trencher assembly (e.g., location-determining sensor or receiver that determines position, such as described above). The controllers may, in turn, communicate operational or other instructions to these items, such as for controlling speed, direction of travel, attitude or depth of the tube trencher, and providing alerts and operational status regarding a cutter tube trencher, injector boot, or other items, accessories and components of cutter tube trencher assemblies.

BRIEF DESCRIPTION OF THE DRAWINGS

For a more complete understanding of example embodiments, reference is now made to the following descriptions taken in connection with the accompanying drawings in which.

Figure 1:
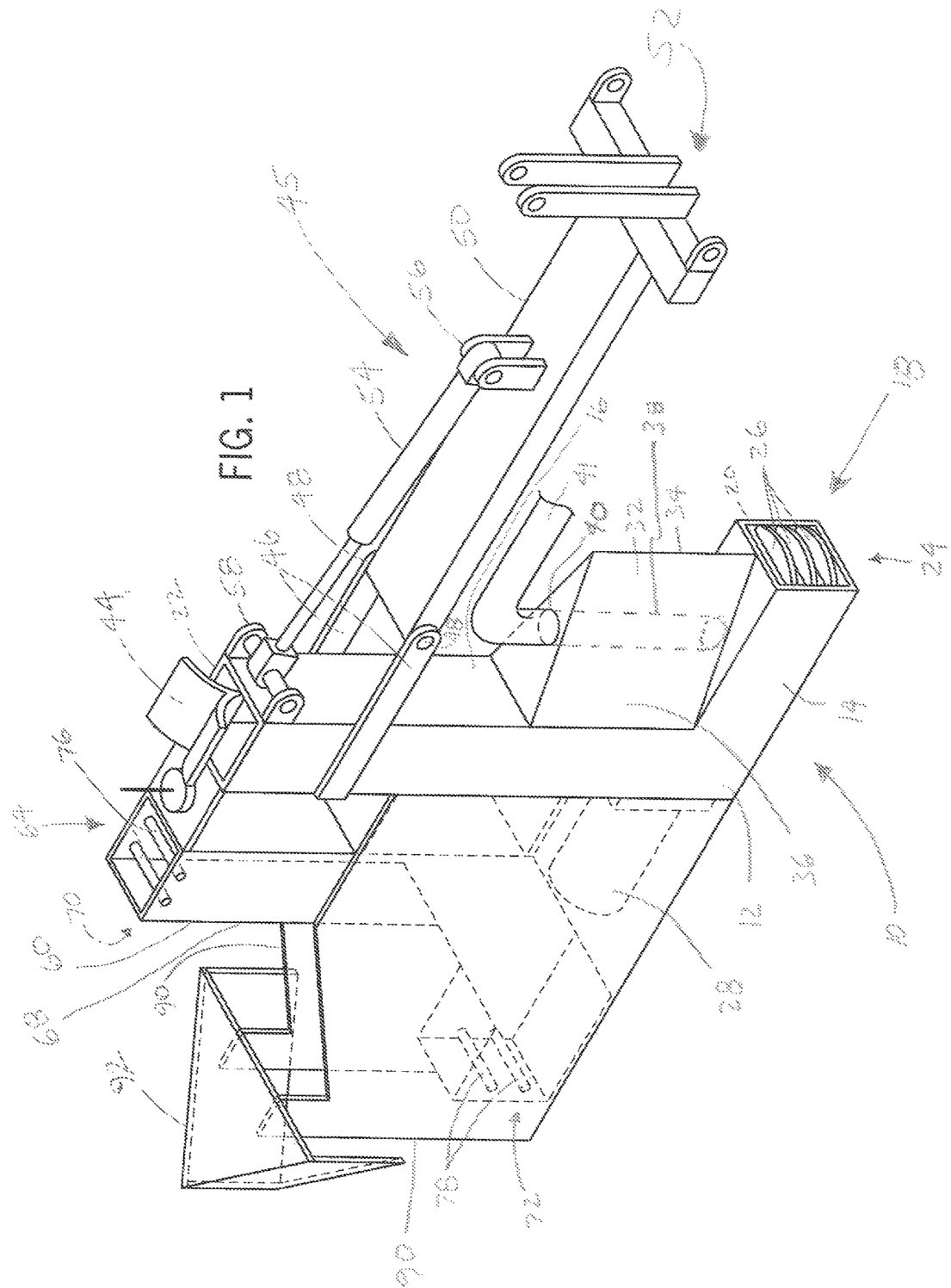
FIG. 1 is a perspective view of a cutter tube trencher and an injector boot in accordance with an embodiment.

While the present invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, and modifications and variations are possible in light of the teachings herein, or may be acquired from the practice of various embodiments.

DETAILED DESCRIPTION

To meet demanding conditions presented by various types of earth and soil, trench-cutting devices are often large in size, and may incorporate bulky, heavyweight components and complex mechanical apparatuses. Due to the high cost of heavy equipment, trench-cutting machinery is often rented, or contractors with such equipment are hired for trench-cutting operations. However, the use of trench-cutting equipment that is sparsely available due to its cost may require advance scheduling or waiting for the equipment to become available, potentially delaying projects. Delays that result from waiting for trenching equipment to become available may significantly impact seasonal or time-sensitive operations, such as preparing fields to plant crops, among other agricultural operations.

Moreover, trenching equipment that drives a solid plow-like member through soil can tightly compress and pack the soil, thus causing soil compaction or densification. Compacted or densified soils exhibit a reduced capacity to absorb rainfall, potentially increasing runoff and erosion in areas where compaction or densification has occurred, and often reduces the efficacy of drain tile by hindering the flow of water to the drain tile. Compacted or densified soil may also impede the root growth of plants, thus potentially affecting crops. In addition, the use of plow-like trenching devices may require additional finish trenching to achieve a desired trench configuration. For example, when plow-like trenching devices are employed, they may often rise and fall as the trench-cutting apparatus advances through soil of variable density, due to the variable resistance of the soil to the plow. Such "dolphining" may result in uneven or unlevel trenches. Effects such as "dolphining" may require extra time and labor to produce a desired trench profile and depth, while soil compaction and densification may impede soil drainage and crop growth.

Such effects may be mitigated by devices described herein. Example embodiments and their potential advantages are understood by referring to FIGS. 1-9 of the drawings. Embodiments relate to systems, methods and devices for cutting a trench in soil by driving a cutter tube member through soil and directing or injecting compressed air into the cutter tube member, to break up the soil, partially or fully fluidizing the soil, and expelling it through and out of the cutter tube member.

Figure 2:
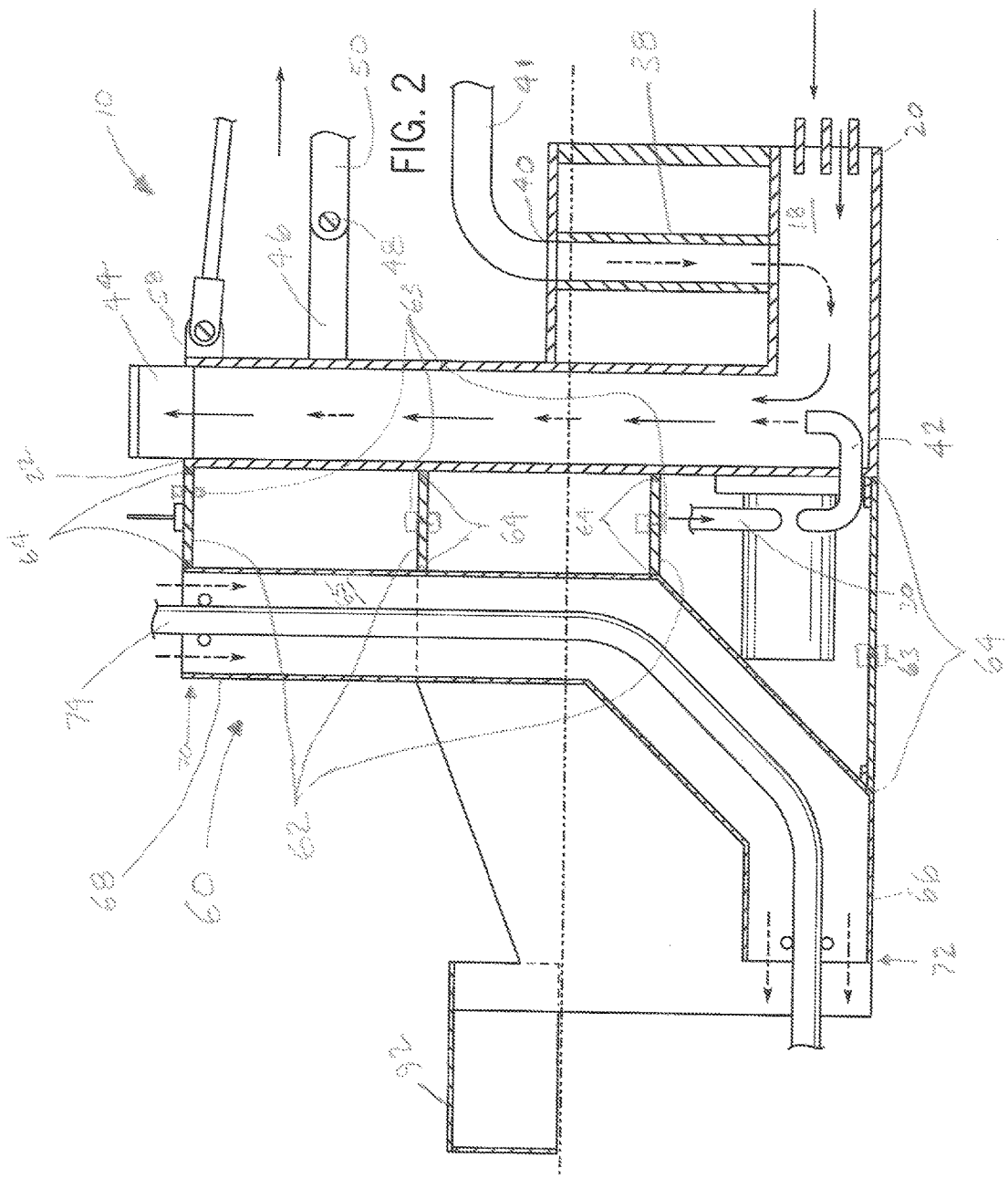
FIG. 2 is a sectional side view of a cutter tube trencher and an injector boot in accordance with an embodiment.

An exemplary cutter tube trencher 10 in accordance with an embodiment is shown, generally, in FIG. 1. Cutter tube trencher 10 includes an approximately L-shaped cutter tube member 12, defined by an intake section 14 connected to an ejector section 16 that extends approximately vertically upward from the intake section 14, forming a substantially hollow and continuous tubular or tube-like passage 18. Passage 18 extends through cutter tube member 12 from intake 20, located at a free end of intake section 14 that is opposite ejector section 16, to ejector port 22, located at a free end of ejector section 16 that is opposite intake section 14. As illustrated in FIGS. 1 and 2, passage 18 extends through intake section 14 and ejector section 16, and is in fluid communication with intake 20 and ejector port 22, providing a substantially continuous passage therebetween.

Of course, embodiments may exemplify various relationships between intake section 14 and ejector section 16, and are not limited to an L-shape. Rather, in embodiments, ejector section 16 may be oriented at various other angles relative to intake section 14 and ejector port 22 may be located above the surface of soil while intake 20 is driven through soil or earth at some depth below the surface. Moreover, the cross-section of passage 18 is not limited to any particular shape or tubular configuration, but may be square, circular, rectangular, ovoid, or any other shape. In embodiments, passage 18 may have a constant or variable cross-section and area. As cutter tube member 12 is driven through soil or earth with the free end of intake section 14 leading, soil enters, or is forced into or received by, intake 20 and is forced or driven through passage 18 to ejector port 22, from which the soil is ejected from cutter tube member 12, thus excavating and leaving a trench or void (which may be elongated) in the soil as cutter tube trencher 10 advances.

In addition, embodiments may include a guard member 24 affixed to or integrated into intake section 14 of cutter tube member 12, at intake 20. Guard member 24 may preliminarily break up cohesive (non-granular) or cemented soil as it enters intake 20, and also deflect large rocks or other objects to prevent clumps of cohesive or cemented soil or other items from entering and potentially blocking passage 18. Guard member 24 may include multiple blades 26, mounted to intake 20 and spaced to allow soil to enter intake 20, and to break up the entering soil into smaller chunks, while keeping out larger rocks and other debris that may jam or clog passage 18 or otherwise damage cutter tube member 12. The structure of guard member 24 is not limited to a set of spaced multiple plates 26, but rather, guard member 24 may be a heavy wire mesh, a solid plate with openings, or any other structure that allows soil to enter, while filtering and deflecting other items that cutter tube member 12 might encounter as it advances through earth.

Embodiments may incorporate a vibration-generating shaker 28, affixed or connected to cutter tube member 12 so as to impart a dynamic vibrational energy or force to cutter tube member 12, thus inducing vibration of cutter tube member 12 in order to further break up soil entering cutter tube member 12, and to help fluidize and assist the flow of soil being forced through passage 18. Shaker 28 may be driven by various energy or power sources, such as electrical or hydraulic, or by compressed air via intake tube 30 as illustrated in FIG. 2, for example. Shaker 28 may be connected to cutter tube member 12 at any point that facilitates the imparting of dynamic vibrational energy to cutter tube member 12.

Referring again to FIG. 1, embodiments of cutter tube trencher 10 may incorporate plow blade 32, above intake section 14, and rising vertically along the height of ejector section 16. Plow blade 32 may be wedge-shaped and widen from a tapered leading edge 34, so as to cut into and gradually open earth or soil above intake 20, as cutter tube trencher 10 advances therethrough, excavating the soil. For example, plow blade 32 may widen from tapered leading edge 34, to a width slightly greater than the width of ejector section 16, at trailing portion 36 of plow blade 32. Plow blade 32 may be a separately formed component, or alternately, plow blade 32 may be integrally formed with either intake section 14, ejector section 16, or both. As more clearly illustrated in FIG. 2, duct 38 may extend from passage 18 through plow blade 32, so as to be in fluid communication with passage 18. As will be described in greater detail, below, duct 38 may be configured to receive compressed fluid (e.g., air) at fluid intake 40 from fluid tube 41, and facilitate the injection of the compressed fluid into passage 18, to break up soil passing or being forced through cutter tube member 12, partially or fully fluidize the soil, and assist the flow of soil therethrough, by the action of volumetric expansion of compressed fluid flowing from a region of high pressure to a region of lower pressure. As described in greater detail below, fluid may be sourced to duct 38 via fluid tube 41 from sources such as, for example a pump, compressor, or an air blower powered by or integrated into a power take-off unit (pump, compressor not shown; power take-off air blower illustrated in FIG. 6), or powered by another power source. In embodiments, compressed air exhausted from shaker 28 may also be plumbed to cutter tube member 12 for injection into passage 18, thus enhancing the effect of breaking up soil and assisting its flow through passage 18. For example, air exhausted from shaker 28 may be routed directly to passage 18 via injection tube 42. Of course, fluids such as water or drilling muds, for example, or others, may be employed in embodiments rather than compressed air for the purposes and effects described above. In addition, more than one duct may be connected in fluid communication with passage 18; indeed, any number of ducts may be configured to provide the injection of fluid into passage 18.

Due to the velocity and momentum of soil entering passage 18, and the additional velocity and momentum imparted to the soil stream moving through passage 18 by the injected pressurized fluid, soil may be ejected from ejector port 22 at high velocity and momentum. This may result in a chaotic scattering of soil in every direction, including, back into the trench or void just produced or left in the soil. To direct ejected soil in a lateral or downward direction, ejector section 16 may include deflector 44 located at ejector port 22, as illustrated in FIGS. 1 and 2. Deflector 44 may be configured so as to direct ejected soil to one or both sides of a freshly dug trench, for ease of refilling the trench over the deposited conduit or media and any backfill material also deposited into the trench as discussed in greater detail, below.

Figure 3:
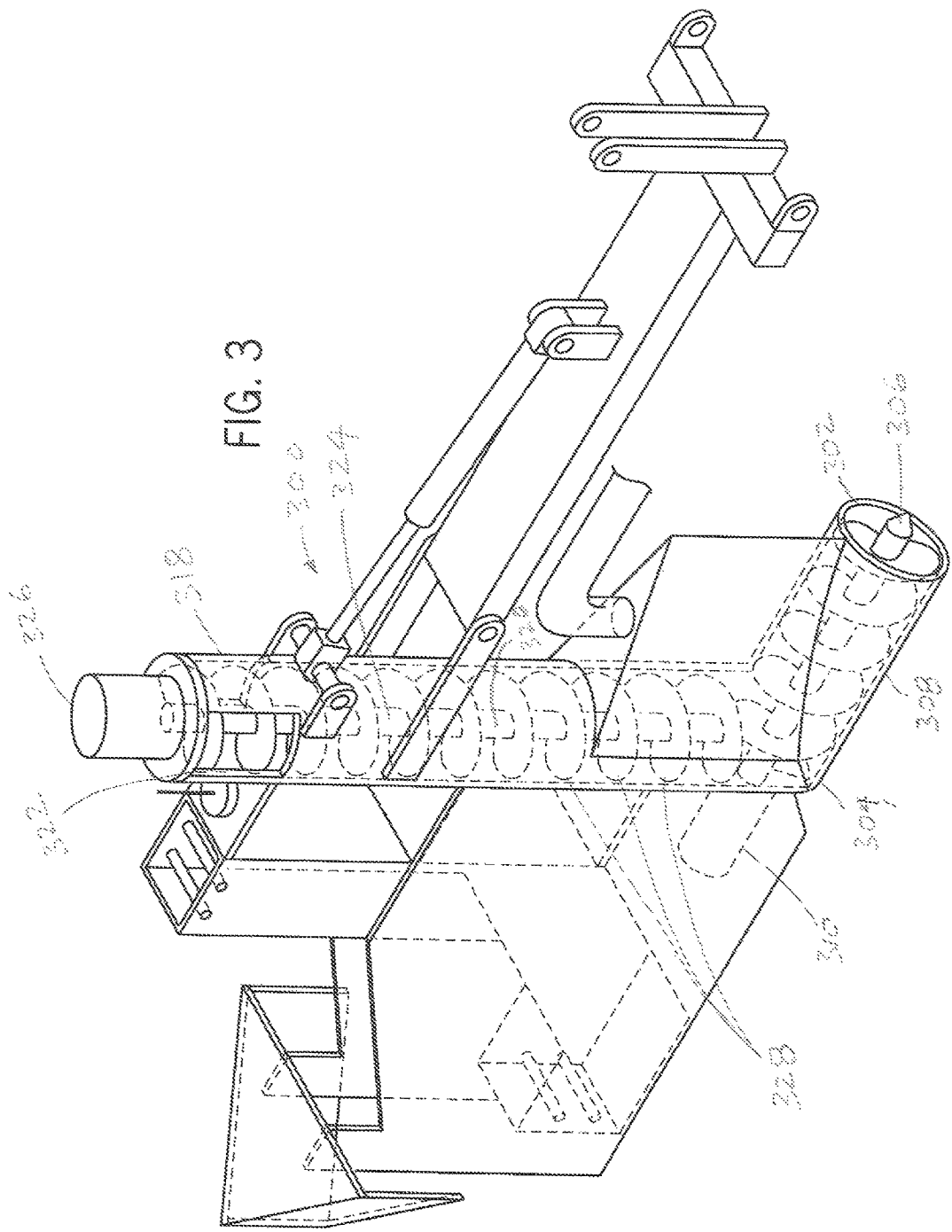
FIG. 3 is a perspective and partially cut-away view of a cutter tube trencher and an injector boot according to an embodiment, wherein the cutter tube trencher incorporates one or more augers for excavating soil or earth.
Figure 4:
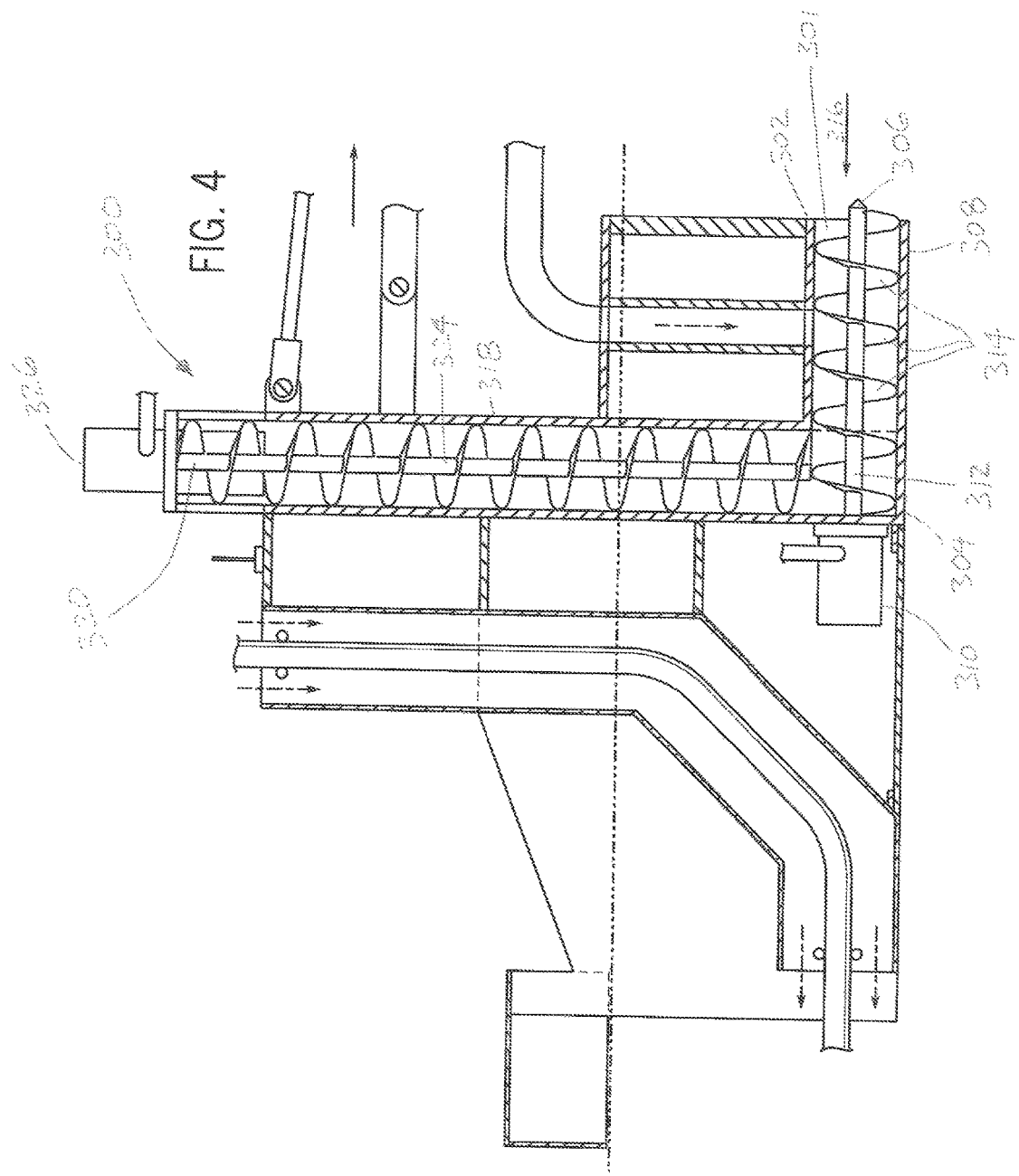
FIG. 4 is a sectional side view of a cutter tube trencher and an injector boot in accordance with an embodiment wherein the cutter tube trencher incorporates one or more augers for excavating soil or earth.

As illustrated in FIGS. 3 and 4, embodiments of cutter tube trencher 300 may also include one or more rotary augers disposed within passage 301, for breaking up soil that is forced into passage 301 through intake 302, and moving the soil into and through cutter tube member 304. FIG. 4 shows intake auger 306 disposed in passage substantially within intake section 308. Intake motor 310 rotationally drives intake auger shaft 312, thus rotating helical intake blades 314. As cutter tube trencher 300 is driven through soil, soil enters intake 302, as shown by arrow 316, and is cleaved and separated by rotating intake blades 314. Rotating intake blades 314 force or drive the soil through intake section 308, toward ejector section 318. As illustrated in FIG. 3, when the soil reaches ejector section 318, ejector auger 320, disposed substantially within ejector section 318 and operating similarly to intake auger 306, forces the soil through ejector section 318, to ejector port 322, where the soil is discharged from ejector section 318. That is, as ejector auger shaft 324 is rotatingly driven by ejector motor 326, helical ejector blades 328 rotate, thus driving or conveying the soil from intake section 308 through passage 301 to ejector port 322, from which the soil may fall or be directed to the ground surface adjacent the trench being cut. Of course, in embodiments, cutter tube trencher 300 may be configured with various numbers and configurations of augers, driven by one or more motors. In addition, the motors may be powered by the various power sources described in connection with embodiments, for powering cutter tube trencher and injector boot accessories and components.

In embodiments, cutter tube trencher 10 may be configured for attachment to vehicles or other motive equipment, such as farm tractors or bulldozers, for example, which may push, pull or otherwise urge or drive cutter tube trencher 10 through earth or soil. Referring again to FIG. 1, cutter tube trencher 10 may incorporate attachment bracket assembly 45, which may further incorporate brackets 46 with eyes 48 for coupling cutter tube trencher 10 to one end of mating connector 50. In an embodiment, brackets 46 and eyes 48 may form a pivoting connection, although various types of pivoting or even fixed connections may be employed between cutter tube trencher 10 and mating connector 50. The opposite end of mating connector 50 may be attached to a tractor, bulldozer or other vehicle or motive equipment. While not limited to any type of standard or non-standard hitch or connection apparatus, in an example embodiment, mating connector 50 may be attached to a vehicle, tractor or other motive equipment through a standardized 3-point hitch 52 incorporated into mating connector 50, or through some other type of standardized or custom connector. In addition, mating connector 50 may incorporate hydraulic arm 54, attached at one end to connector mount 56 disposed on mating connector 50, and at the other end, to attachment bracket 58 that is disposed on ejector section 16. Hydraulic arm 54 and its positioning relative to ejector section 16 and connector mount 56 may facilitate raising, lowering, leveling, adjusting the pitch of, or otherwise moving or orienting cutter tube trencher 10 for desired trench cutting operation. For example, hydraulic arm 54 may be positioned and mounted to allow for lowering and raising cutter tube trencher 10 into and out of soil. In addition, actuation of hydraulic arm 54 may raise, lower and otherwise adjust the depth of trench cutting. Embodiments are not limited to the use of a single hydraulic arm. Indeed, the incorporation of multiple hydraulic arms and adjustment of the attachment points of the hydraulic arms may facilitate control of the angle or attitude at which cutter tube trencher proceeds through soil. Such adjustability may permit continuous adjustment of the depth and angle of a resulting trench "on the fly" and maintain a desired pre-set grade or follow the contour of the earth, or follow constant slope independent of the contour of the earth, during trenching operations. Of course, embodiments may also include connector mechanisms with limited or no adjustment capability; and any type of applicable vehicle connector mechanisms and mechanical adjustment components, whether powered or manually operated, may be utilized to connect cutter tube trencher 10 to a tractor or other motive equipment, and to control, position or locate cutter tube trencher 10 for and during trenching operations.

As illustrated in FIGS. 1 and 2, the deployment of media and/or backfill material into a trench as soil is excavated by the cutter tube trencher may be facilitated by injector boot 60. Injector Boot 60 may be fixedly or pivotably attached to cutter tube member 12 by attachment brackets 62, so that injector boot 60 follows or moves behind cutter tube member 12 as cutter tuber member 12 is driven through soil. Of course, any manner and number of pivoting hinges or fixed attachment methods may connect injector boot 60 to cutter tube member 12. For example, one or more of attachment brackets 62 may include pin connectors 63, which facilitate lateral pivoting vis-à-vis cutter tube member 12, and/or hinge connectors 64, to facilitate vertical pivoting vis-à-vis cutter tube member 12. The pivoting attachments may permit flexibility and articulation of injector boot 60 vis-à-vis cutter tube member 12, especially as the direction in which cutter tube member 12 is driven through soil changes. This may occur, for example, when a trench must avoid obstacles, or a trenching operation continues at a new angle to the prior trenching direction, or reverses direction altogether. Of course, in embodiments, injector boot 60 may be integrally formed or assembled with cutter tube member 12 as a unit.

Injector boot 60 may be configured with a hollow, substantially continuous tube or tube-like media channel 65 extending therethrough. Exit leg 66 of injector boot 60 may extend in a direction away from cutter tube member 12, and entry leg 68 may extend upwardly from exit leg 66. Of course, many possible orientations of entry leg 68 with respect to exit leg 66 exist, and they may be configured or connected in any relative orientation or relationship that facilitates the passage of media and/or backfill material through injector boot 60. Feed port 70 may be formed or attached at or near a first end of media channel 65 at an end of entry leg 68 that is distal from exit leg 66, for receiving media and/or backfill material to be deployed in the trench or void. Discharge opening 72 may be formed or attached at or near a second end of media channel 65 at an end of exit leg 66, such that feed port 70 and discharge opening 72 are connected in fluid communication by substantially continuous media channel 65. For example, as illustrated in FIG. 2, conduit 74 enters feed port 70, with or without backfill material, passing through media channel 65, to exit leg 66. When it reaches the second end of exit leg 66, conduit 74 and any backfill material pass through discharge opening 72, which is disposed at or near the end of exit leg 66 that is distal from entry leg 68, and conduit 74 and any backfill material are thus released into the trench. As more clearly illustrated in FIG. 1, feed port 70 may include feed rollers 76, and discharge opening 72 may include discharge rollers 78. Feed rollers 76 may serve to guide conduit or media into feed port 70 and into media channel 65, and prevent the conduit or media from scraping along the edge 80 of feed port 70. Discharge rollers 78 may serve to release the conduit or media into the trench and position it at a particular depth in the trench. Indeed, feed rollers 76 may be independently adjustable across feed port 70, so as to accommodate different sizes and types of conduit or other media and guide the conduit or media into media channel 65 at different orientations and entry angles. For example, a particular entry angle may be needed to prevent media or conduit from kinking or bending to extreme or damaging angles when entering feed port 70. On the other hand, discharge rollers 78 may be independently adjustable across discharge opening 72, to accommodate different sizes and types of media and/or backfill material, and to position the released media and/or backfill material at a desired depth and in a desired relationship in the trench. Of course, feed port 70 and discharge opening 72 may include various types of fixed or adjustable guides other than roller guides.

Backfill material, such as sand or gravel, may be deposited into the trench with the deposited conduit or media for various reasons, including, without limitation: i) to facilitate groundwater flow into drain tile; ii) filtering fine soil particles to limit their entering and clogging drain tile; iii) fertilization or chemical alteration of the surrounding soil; iv) adding amendments to the surrounding soil; v) providing fertilizer filtration/biological absorption/migration control integral with the backfill material; vi) changing the thermal conductivity properties of the soil to enhance or decrease thermal loss from installed conduits; or vii) for abrasion or puncture protection of conduit or media that is deposited into the trench (in addition to protecting conduit or media from the potential for damage from inanimate objects in soil, or root growth, the backfill material may also deter burrowing wildlife, which can also threaten the integrity of conduit or media). The backfill material may partially or fully surround the conduit or media. In addition to sand or gravel, the backfill material in agricultural applications may include bio-char, sawdust and/or wood chips to encourage biological activity to help remove excess fertilizer runoff from migrating into the drain tile system and eventually being discharged into surface waters. In applications, hydraulically conductive backfill material (e.g. sand) may allow the use of smaller diameter and less expensive drain tile, while increasing cross-sectional drain perimeter flow area in contact with the surrounding soil for more efficient and cost effective drainage. Sand backfill may also act as a filter, controlling the migration of fine soil particles into the drain tile, which can clog drain tile perforations, decrease cross-sectional flow area of the drain tile, or eventually add to siltation of surrounding surface waters. Other types of backfill material in utility installations may include particulate insulating media (e.g., foam beads) to control frost penetration, or thermally conductive particulate media (slag) to help dissipate heat from high-powered electrical lines.

Injector boot 60 may be configured to receive and discharge or release backfill material into a freshly cut trench as cutter tube trencher 10 is driven through soil or earth. In embodiments, backfill material may be fed directly into feed port 70 via a hose, pipe, chute, belt mechanism or other mode of conveying filler material to feed port 70. A hopper or funnel may be attached to or integrated into feed port 70 to facilitate receiving and directing the filler material into feed port 70. The backfill material may be delivered from a separate vehicle, such as a dump truck, that is leading, following or otherwise advancing with cutter tube trencher 10. Alternately, as discussed in greater detail below, backfill material may be contained in a bin or other receptacle located on a trailer or wagon that is directly or indirectly connected to and advances with cutter tube trencher 10. As the backfill material is delivered to feed port 70 from the separate vehicle, trailer or wagon, the backfill material travels through media channel 65 and releases or is discharged into a trench, along with media, from the discharge opening 72. In embodiments, a separate and continuous or semi-continuous tube-like passage may be attached to or integrated into injector boot 60, either within or external to media channel 65, for receiving and guiding backfill material into a trench along with the media. As discussed above, discharge rollers 78 may be adjusted to deposit media into or onto the backfill material at various desired depths or relationship with each other. Of course, any combination of media or backfill material, including multiple types of each, may be received by and deposited into the trench through injector boot 60. Also, in embodiments, only media, or only backfill material itself, may be received by and deposited via injector boot 60. In embodiments, media channel 65 may be subdivided into any number of sub-channels, tubes, or tube-like passages. This may allow for multiple individual feeds and various combinations of media and backfill material, including multiple types of each, to travel through injector boot 60 in separate sub-channels, tubes or tube-like passages.

As will be discussed in greater detail below, backfill material may be conditioned with compressed and/or heated, dried or otherwise conditioned air that is routed into the supply or flow of backfill material into media channel 65. Such conditioning air may be sourced from a compressor or other air source in combination with a pre-heater. In embodiments, a pre-heater may include a fan, one or more heat exchangers and ducting that gather air heated by the engine heat or exhaust of a tractor or other motive equipment to which cutter tube trencher 10 may be attached, or from some other heat source (e.g., an electric, propane or diesel fueled heater), and routes the heated air to media channel 65 as the backfill material is being received therein. In similar fashion, heated air derived from a tractor engine or other heat source such as an electric/propane/diesel pre-heater, for example, may be routed directly to cutter tube member 12, for improving the flow of soil or earth through the tube member.

Referring again to FIG. 1, embodiments may be fitted with guard plates 90, extending upward and approximately longitudinally along the sides of injector boot 60 to some point along exit leg 66, or beyond discharge opening 72. Guard plates 90 may be attached to cutter tube member 12 or injector boot 60, and may extend upwardly to a point above the surface of the soil, so that when cutter tube trencher 10 is being driven through earth, guard plates 90 prevent the walls of a freshly-cut trench from closing or collapsing back into the trench, or earth from falling off the sides of the trench walls into the bottom of the trench before conduit, media and other substances are properly installed in the trench. Such collapse or untimely refilling of the trench may result in unsatisfactory positioning of the media in the trench or sub-optimal surrounding of the conduit or media by the backfill material, thus possibly reducing efficacy of the drainage mechanism. Trenches cut in areas of heavily soaked soil are particularly vulnerable to this outcome. Guard plates 90 extending rearward beyond discharge opening 72 can stave off such trench wall collapse or untimely backfill until after the conduit or other media and filler material have been properly installed in the trench.

Guard plates 90 may also facilitate installation of a vertically-extending portion of drainage media or conduit especially when a trench is being cut in waterlogged or unstable soil. Indeed, an operator of cutter tube trencher 10 may stop the trench cutting where such a vertically-extending portion is desired, such as in an area of a field that is prone to gathering surface water due to low-lying topography, for example. The vertically-extending section may reach or extend above the soil surface and facilitate direct drainage to an underlying section of drain tile or other media that is laid in the trench, rather than relying on water to reach the underlying media by draining through the entire column of soil. When the advance of cutter tube trencher 10 through soil is stopped, guard plates 90 will prevent the trench walls from collapsing, or soil from falling into the area where a vertically extending conduit or media is being attached to the main section of underlying conduit or media that is deposited in the trench, whether by injector boot 60 or some other way, such as by hand or other type of conduit feeder. When the vertically-extending section is attached to the underlying section, the operator may resume the trenching operation and stop at the next location where a vertically-extending section of conduit or media may be needed.

As illustrated in FIGS. 1 and 2, in embodiments, scraper 92 is attached to guard plates 90. As cutter tube member 12 moves forward, driving through soil and excavating a trench or void, scraper 92 drags along the soil surface behind cutter tube member 12 and pushes the excavated soil or earth back into the trench or void, thus covering up the media and/or the backfill material. Of course, scraper 92 may also be attached directly to injector boot 60, or cutter tube member 12, or components thereof. As discussed in greater detail below, scraper 92 may be integrated into other vehicles or equipment used in conjunction with one or both of cutter tube trencher 10 and injector boot 60.

Figure 5:
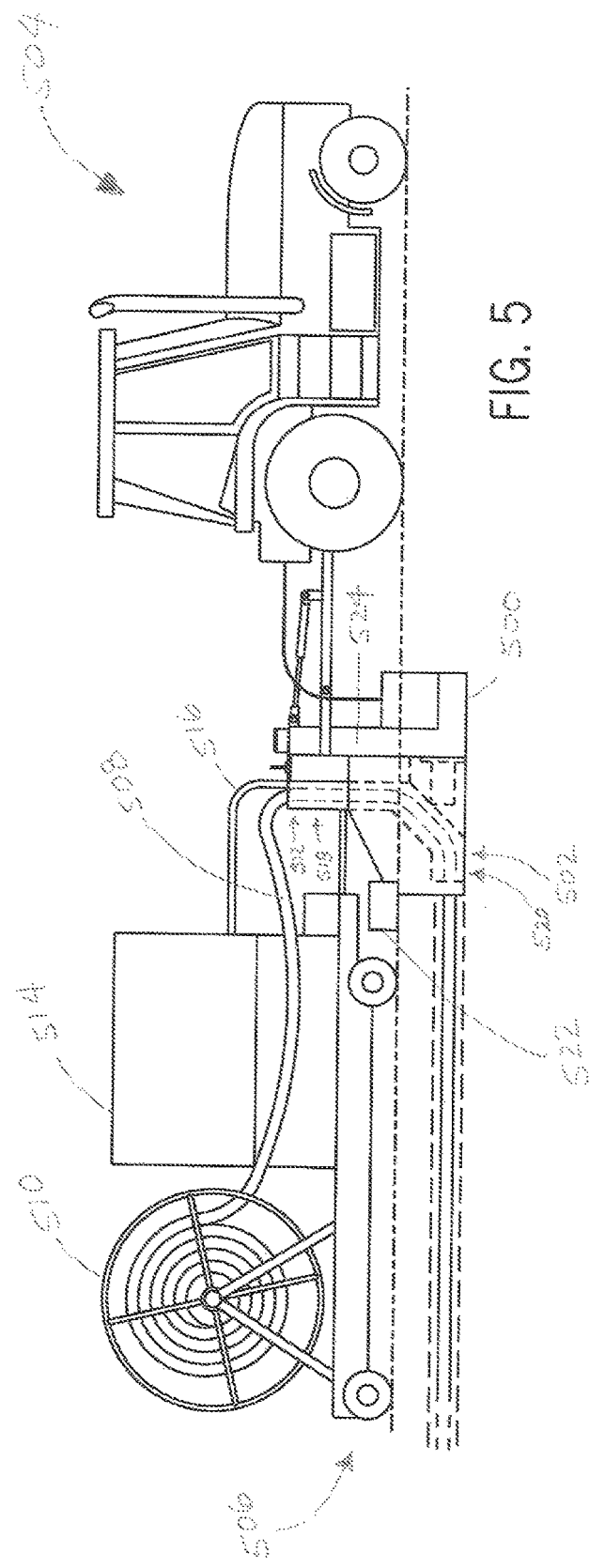
FIG. 5 is a side view of a cutter tube trencher and an injector boot according to an embodiment, in combination with a tractor for pulling the cutter tube trencher, and a trailer for carrying conduit, media and other substances to be deposited into the trench, as well as power sources and other inputs for cutter tube trencher and injector boot accessories.

Turning now to FIG. 5, there is illustrated a combination of cutter tube member 500 and injector boot 502 attached to tractor 504, which is driving cutter tube member 500 through sub-surface soil by pulling it across the surface and sub-surface of the soil. Also illustrated in FIG. 5 is trailer 506, attached to cutter tube member 500 or injector boot 502, and is thus pulled in series therewith by tractor 504. In an example embodiment, conduit 508 unwinds and feeds from reel 510 into feed port 512 as cutter tube member 500 advances. In addition, backfill material may be fed from bin 514 to feed port 512 via tube 516. Conduit 508 and backfill material may pass through media channel 518 and be deposited into a trench from discharge opening 520. As discussed above, injector boot 502 may also incorporate scraper 522, attached thereto, or a scraper may be integrated with or attached to a trailer or other vehicle moving with cutter tube member 500, to push soil ejected from the trench through ejector section 524, back into the freshly cut trench, thus covering the deposited conduit 508 and other material.

Figure 6:
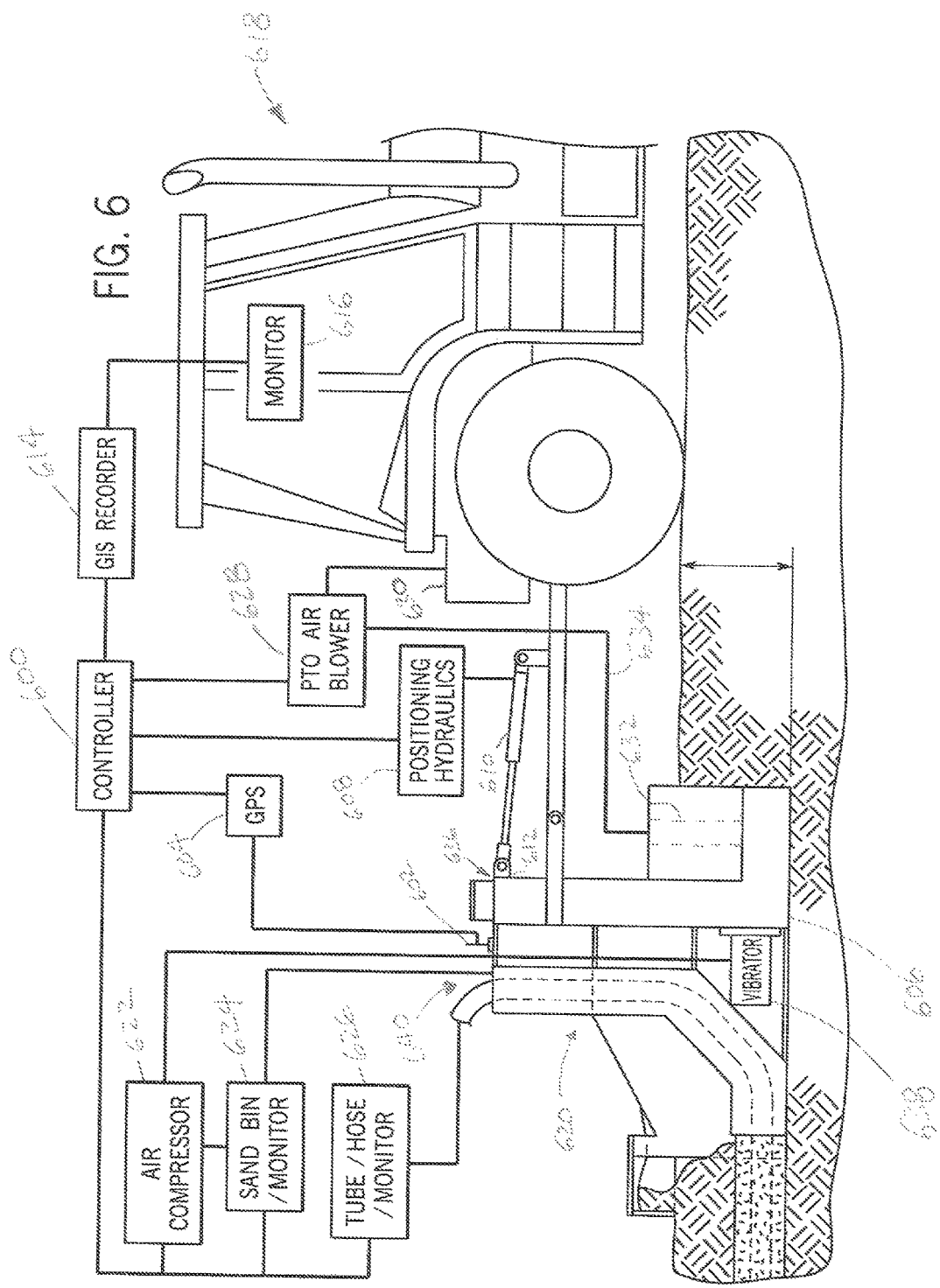
FIG. 6 is a schematic view of the various inputs and outputs of a cutter tube trencher and an injector boot according to an embodiment, in combination with a tractor for pulling the cutter tube trencher, and a trailer for carrying conduit, media and other substances to be deposited into the trench, and also illustrating transmission paths for communications and materials as well as power flows.

In addition, embodiments may incorporate guidance and level-control systems, to control heading, depth of trench cutting, and flatness or incline of a trench as it is being cut, especially where a particular grade or incline of a trench is needed or desired for effective drainage. Various types of control, guidance and level-control devices and systems may be employed, and they may be based on any type of input or control, such as radar, infrared, laser, inertial, gyroscopic, radio-wave, LORAN, locations based, or Global Positioning System ("GPS"). In embodiments, such systems may interface with controllers that may be programmed with particular trench cutting job parameters (e.g., desired consistent or variable depth, grade or slope of the trench, or angle or flatness of the trench). As illustrated in FIG. 6, controller 600 may receive data and inputs from sensor 602, which may be a location-determining receiver for determining a position of the trench cutting apparatus, as well as other control inputs issued from other sensors and apparatus such as those mentioned above (e.g., LORAN, inertial, infrared, etc.), such as from GPS unit 604. Indeed, inputs such as programming instructions or pre-programmed operational routines may also be issued or input via a user interface, and received by controller 600. Of course, multiple sensors may be deployed in embodiments, or a single sensor, such as sensor 602, may generate information regarding location, velocity, angle, acceleration, and various other parameters regarding positioning and operation of cutter tube member 606. Controller 600 may then generate and send output signals to positioning hydraulics module 608, which may in turn issue signals to adjustable connector portions by which cutter tube member 606 may be positioned or controlled, such as hydraulic arm 610, for example. The signals from positioning hydraulics module 608 may cause raising, lowering, leveling, or other positioning of cutter tube member 606. In an example, a guidance system may be programmed to maintain a particular grade or pitch of cutter tube member 606 during a trench cutting operation. Controller 600 may thus receive inputs from sensor 602, as well as from positioning or other control systems, such as GPS unit 604. Controller 600 may then send signals to hydraulic or mechanical adjusters such as hydraulic arm 610, as discussed above, that may impart pushing or pulling forces onto ejector leg attachment bracket 612. Hydraulic arm 610 may thus control, vary, and maintain the desired orientation and attitude of cutter tube member 606 based on programmed instructions, positional inputs from sensor 602, and location/control inputs such as from GPS unit 604, so as to achieve the desired trench cutting results.

The various sensor and location/control inputs may feed into Geographical Information Systems (GIS) recorder 614 for analysis, determination and recording of the exact locations where trenches are cut and media are buried under the earth. The recorded information may provide valuable information and insight as to soil characteristics and ground topography, and may facilitate locating buried conduit or media later, when repair, replacement, or removal may be needed. Such detailed positional records and information may also prevent inadvertent damage to buried media during later excavation or trenching in the area where the items were buried. In embodiments, monitor 616 may be provided in a convenient location, such as in tractor 618, for example, to receive and display the various positional, locational, geographic and other data inputs and recorded data in real-time during a trenching operation, and facilitate adjustments by an operator. A touch screen on monitor 616, or other user interface, such as a keyboard, disk drive, flash drive port, etc., may facilitate the input and issuance of instructions or operational parameters to controller 600. For example, such instructions may be pre-programmed and uploaded, received wirelessly, or directly input by an operator.

In embodiments, controller 600, cutter tube trencher 606, injector boot 620 and the various input and output and control components and sensors communicating with and among themselves may constitute a cutter tube trencher guidance or control system. Such a system may provide for manual or automatic, or pre-programmed control of the various components and accessories of a cutter tube trencher apparatus, such as cutter tube member 606, injector boot 620, and various other related controllable accessories, in response to input received by controller 600. For example, in addition to the positional, locational and geographic inputs and data described above, controller 600 may communicate operational instructions to, and receive input and feedback from, controllable components and accessories such as e.g., air compressor 622, bin monitor 624, tube/hose monitor 626, and PTO air blower 628. Indeed, inasmuch as PTO air blower 628 may constitute an air blower powered by or integrated into power take-off 630 to provide a forceful stream of air into duct 632 via air tube 634, in order to break up soil in cutter tube member 606 as the soil flows toward and out of ejector port 636 as discussed above, controller 600 may provide signals to control accessories such as, for example, to turn PTO air blower 628 on and off, increase or decrease air pressure, or any other relevant instructions. The instructions may be generated and issued by controller 600 in response to inputs and other data and information issued from the various sensors or a user interface. Controller 600 may also provide similar operational signals or instructions to air compressor 622, which may be configured to operate shaker 638, and provide conditioned air into feed port 640, to condition the backfill material flowing through injector boot 620. In determining and generating such operational signals or instructions, controller 600 may receive and utilize feedback and input signals from air compressor 622 and shaker 638, as well as bin monitor 624 and tube/hose monitor 626. Bin monitor 624 and tube/hose monitor 626 may generate input signals based on the condition and level of backfill material in bin 514 (see FIG. 5) and the condition and length of conduit or other media on reel 510 (FIG. 5), respectively. For example, air compressor 622 may be shut down by controller 600 if bin monitor 624 indicates that bin 514 (FIG. 5) is empty, to avoid damaging the compressor or subjecting it to excessive wear and tear. Of course, a trench cutting system according to embodiments may incorporate such central control or automated control over any or all of the described components and accessories, as well as others such as lighting, for example. Controller 600 may also receive information from sensors integrated with the various components and accessories in order to record operational information, make adjustments, or display information to an operator. For example, controller 600 may send alerts to an operator of the trench cutter system via monitor 616 when certain operational parameters are met, such as when little or no more media remains on a reel. Communications among the various components of control and guidance system, including input and output signals and instructions described above, may be transmitted through various communication modes, such as via wired or wireless connections, for example.

The various accessories and components of cutter tube trencher 606 and injector boot 620, such as shaker 638, may be driven by various power sources, such as compressed air, for example. Of course, other sources, such as electrical generators may provide power for functions and devices associated with cutting trenches according to embodiments. As discussed above, compressed air may be plumbed at various pressures to various ducts and intakes of cutter tube trencher 606, such as for injection into duct 632 to assist the flow of soil through cutter tube member 606, for example. Air may be sourced for these and other related uses, from one or both of compressor 622 and PTO air blower 628, which may be mounted in any convenient location on cutter tube trencher 606, injector boot 620, or on motive equipment or a trailer being utilized in conjunction therewith. Of course, any number of air sources for these uses may be provided, including additional electrical blowers or compressors, and the air may be provided or routed to each use at an appropriate and distinct pressure. In embodiments, a system of one or more compressors or blowers may be provided and controlled by controller 600, to provide air at various pressures to the various accessories, components and ducts of cutter tube trencher 606 and injector boot 620. Also, controllable accessories and components such as the augers, shaker, etc., may alternately be powered by electrical power sources such as generators or other types of electrical power packs, or by other power sources such as power take-offs on motive equipment, or various combinations of compressed air and other types of power sources, any or all of which may be controlled by controller 600.

Figure 7:
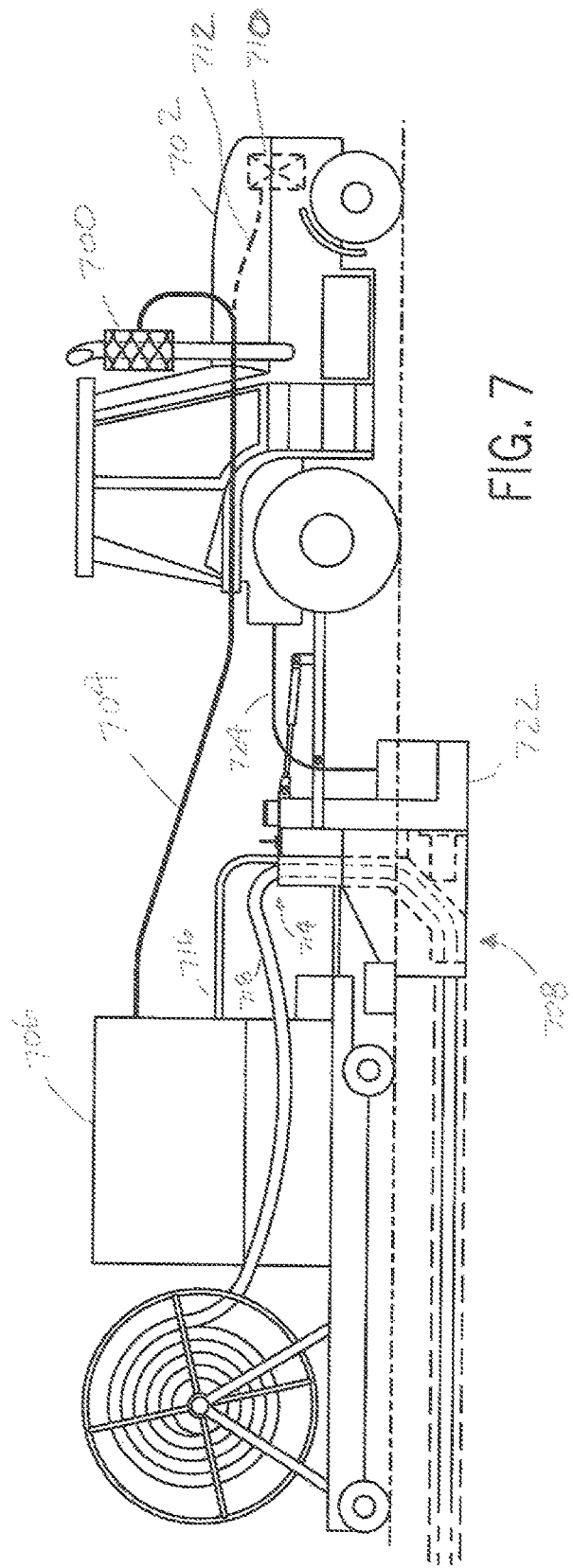
FIG. 7 is a side view of a cutter tube trencher and an injector boot, according to an embodiment, in combination with a tractor for pulling the cutter tube trencher, and a trailer for carrying media and other substances to be deposited into the trench, and also illustrating routing for the delivery of air to condition backfill material.

As discussed above, air that is pressurized, heated, dried or otherwise conditioned may be supplied to the supply or flow of backfill material. Referring now to FIG. 7, exhaust heat exchanger 700 may be integrated into the exhaust system of tractor 702, to generate heated air. The heated air may flow or be forced through conditioning duct 704. For example, a fan located in the air flow path may force the air from exhaust heat exchanger 700 through conditioning duct 704 to bin 706, in which backfill material is being stored for deposit into a trench via injector boot 708. In embodiments, heated air may be additionally or alternatively generated and sourced from an engine heat exchanger 710, and routed through engine heat duct 712. Engine heat exchanger 710 may be integrated into the engine cooling system of motive equipment such as tractor 702, otherwise positioned around the engine of tractor 702 to generate heated air. Of course, fluids other than air may be similarly utilized for conditioning the backfill material.

In embodiments, the heated air being fed to bin 706 may be pressurized, dried or otherwise conditioned along its journey to bin 706, through conditioning duct 704. The air arriving at bin 706 may pressurize the interior of bin 706, in addition to drying or otherwise conditioning the backfill material, thus forcing backfill material out of bin 706 under pressure. The backfill material being forced out of bin 706 may be directed to boot feed port 714 via tube 716, for delivery into the trench by itself or with conduit 718, by injector boot 708. In embodiments, air heated by one or both of exhaust heat exchanger 700 and engine heat exchanger 710 may be routed for conditioning backfill material at any point along the flow of backfill material to boot feed port 714. In addition, pressurized, heated, dried or otherwise conditioned air may be generated by heaters, driers, conditioners or devices other than exhaust heat exchanger 700 and engine heat exchanger 710. For example, any types of dedicated heater, drier, conditioner or other such device may be powered by electricity or any other power source for powering ancillary accessories and components of a cutter tube trencher or injector boot according to embodiments. Furthermore, the conditioned air may be routed for other related uses, such as supplementing or conditioning the air being injected into cutter tube member 722 via injector tube 724, as discussed above.

Figure 8:
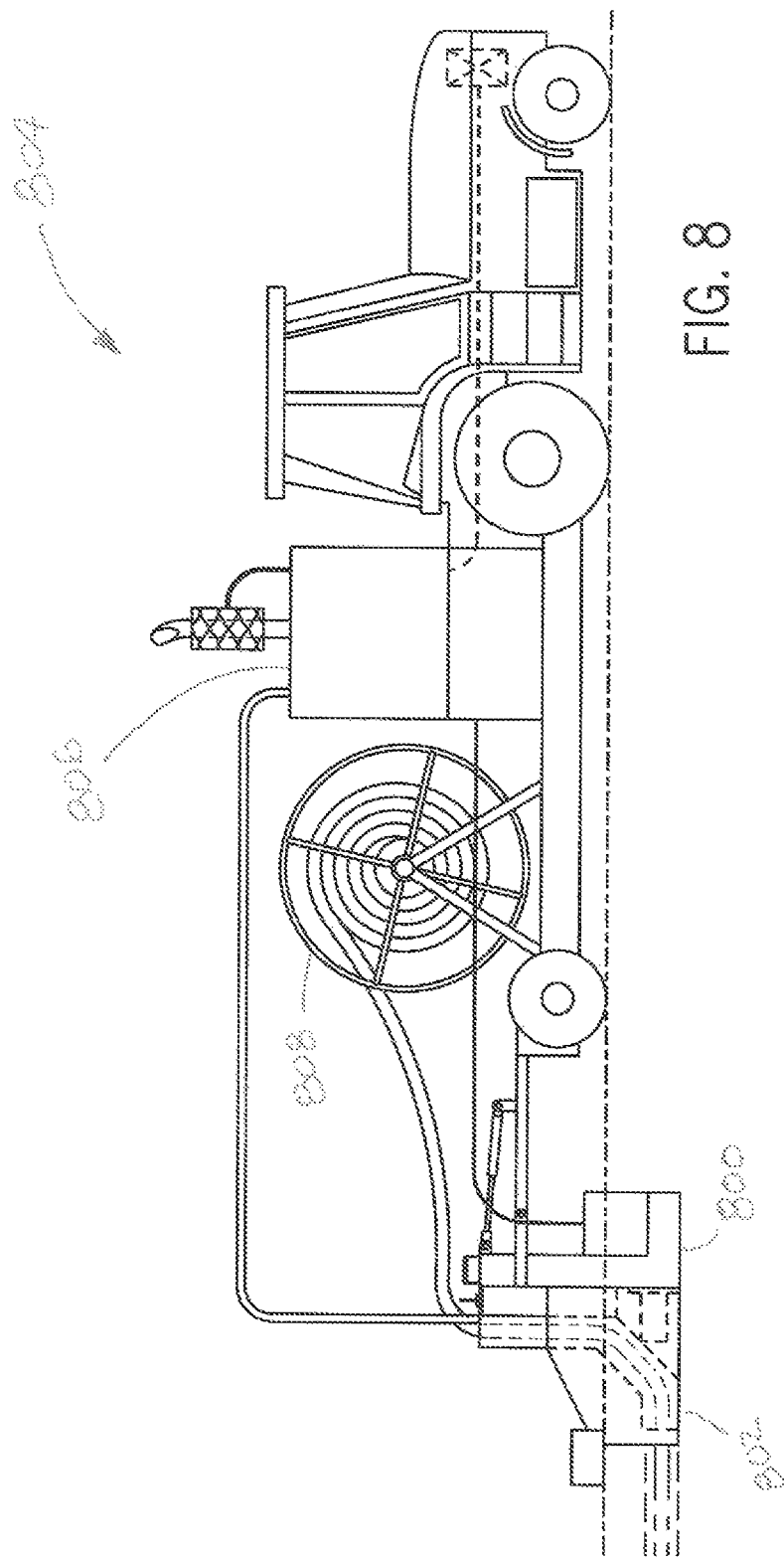
FIG. 8 is a side view of a self-propelled cutter tube trencher and an injector boot according to an embodiment, with accommodation for carrying media and other substances to be deposited into the trench via the injector boot, as well as power sources and other inputs for cutter tube trencher and injector boot accessories and components.

In embodiments, as illustrated in FIG. 8, one or both of cutter tube member 800 and/or injector boot 802 may be integrated with motive equipment to form a unitary cutter tube trencher apparatus 804. Such a unitary cutter tube trencher apparatus 804 may also include capability for carrying backfill material bin 806 and reel 808, as described above. Of course, any combination of cutter tube member 800, injector boot 802 and these other items may be unitarily integrated with motive equipment.

Figure 9:
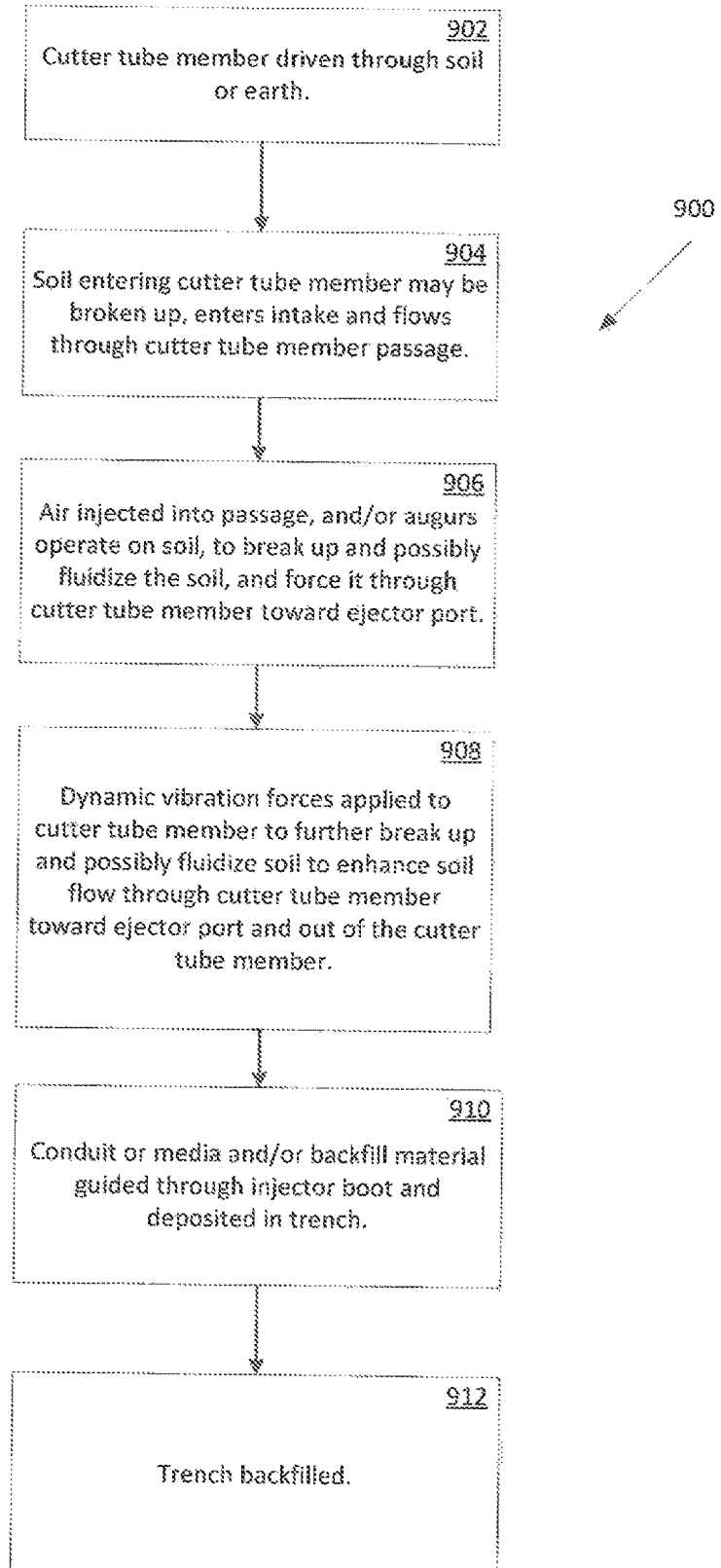
FIG. 9 is a flowchart illustrating the steps of methods of cutting a trench and depositing conduit or media and backfill material, whether separately or together, according to an embodiment.

Referring now to FIG. 9, there is illustrated a set of steps of method 900 for cutting a trench in soil or earth. As illustrated at box 902, a cutter tube member with an intake, an ejector port and a passage, is driven through soil or earth. The cutter tube member may be pushed, pulled or otherwise driven through soil by motive equipment, such as construction or farming equipment (e.g., as tractors, bulldozers, etc.), for example, or under its own power. As the cutter tube member is driven through the soil or earth, with the intake leading, soil may be broken up into smaller pieces or chunks by a guard member as soil enters the intake, and flows through the passage due to the motion of the cutter tube member through the soil, as illustrated at box 904. At box 906, air is injected into the passage to break up the soil, partially or fully fluidize the soil and assist its flow toward the ejector port and out of the tube member, thus creating a trench where the soil has been removed. In embodiments, injected air may be sourced from one or more air compressors, blowers, or other sources. Moreover, in embodiments, one or more augers may break up and fluidize soil in the passage of the cutter tube member either in conjunction with injected air, or without injected air. At box 908, dynamic vibration forces are applied to the cutter tube member by a shaker connected thereto, to further break up the soil and assist its motion through the passage. Powered items such as the augers and shaker may be driven by compressed air, hydraulic oil under pressure or power from a generator or other power source.

At box 910, conduit or media is guided through an injector boot that advances through soil with the cutter tube member, and is deposited into the trench. Backfill material may also be received by the injector boot and deposited into the trench thereby, whether separately or together with the media or conduit. The conduit, media and backfill material may be fed into the injector boot, separately or together, from a trailer or other vehicle moving with the cutter tube member as it is driven through the earth. At box 912, the trench is backfilled with soil that has been removed. The soil excavated or removed from the trench and deposited at the surface may be pushed back into the trench or void by a scraper that may be integrated with or connected to the cutter tube member or the injector boot, or that may move therewith as the cutter tube member is driven through the earth. Various components, accessories, processes, functions or steps may be coordinated by a controller, and directional, locational and positional inputs may be directed to the controller to generate and provide instructions and commands for controlling the depth of the trench, angle of trenching, and other parameters of the trench-cutting operation.

It should be noted that the present disclosure includes various diagrams that may depict an example architectural or other configuration for the various embodiments, which is done to aid in understanding the features and functionality that can be included in embodiments. The present disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement various embodiments. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

It is to be understood that embodiments are not limited to utilizing or employing a single cutter tube member or trench-cutter. Rather, any number of trench-cutters or cutter tube members may be utilized together, independently or in unison, to enhance trench-cutting operations, or perform them at greater scale. In arrays or assemblies of multiple trench-cutters, each may be independently controlled and incorporate functionality, components or accessories that differ from the others. Or, several identical trench-cutters may be utilized together and controlled in unison.

It should be understood that the various features, aspects and/or functionality described in one or more of the individual embodiments are not limited in their applicability to the particular embodiment with which they are described, but instead can be applied, alone or in various combinations, to one or more of the other embodiments, whether or not such embodiments are described and whether or not such features, aspects and/or functionality are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the terms "example" or "exemplary" are used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in, e.g., a non-transitory computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, the term module can describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the disclosure are implemented in whole or in part using software, in one embodiment, these software elements can be implemented to operate with a computing or processing module capable of carrying out the functionality described with respect thereto. The presence of broadening words and phrases such as "one or more," "at least," "but not limited to" or other like phrases in some instances shall not be read to mean that the narrower case is intended or required in instances where such broadening phrases may be absent.

What is claimed is:

1. An apparatus that moves along a surface in a driving direction, comprising:
a cutter tube member having an intake section connected to an ejector section so as to define a passage extending substantially continuously through the cutter tube member;
the intake section having an open end as an intake in fluid communication with the passage and the ejector section having an ejector port in fluid communication with the passage, wherein driving the cutter tube member through soil, in the driving direction, forces soil into the intake and through the passage toward the ejector port, from which the soil is ejected from the passage and a void remains in the soil, the open end of the intake section facing the driving direction; and
an injector boot attached to the cutter tube member, the injector boot comprising a feed port to receive at least one of media or backfill material, and a discharge opening, to release the at least one of the media or backfill material into the void, the feed port and discharge opening being connected in fluid communication by at least one substantially continuous channel passing through the injector boot.

2. The apparatus of claim 1, further comprising:
a duct in fluid communication with the passage and extending therefrom, wherein introducing a pressurized fluid into the duct effectuates injection of the fluid into the passage, at least partially fluidizing the soil forced through the passage;
a shaker connected to the cutter tube member, to impart dynamic vibrational forces thereto, wherein the breaking-up of the soil being forced through the passage is augmented by the dynamic vibrational forces imparted to the cutter tube member.

3. The apparatus of claim 1, further comprising:
one or more augers disposed within the passage, to cleave and break up soil being forced through the passage.

4. The apparatus of claim 1, further comprising:
a guard member affixed to the cutter tube member, to break up soil as it enters the intake.

5. The apparatus of claim 1, further comprising:
an attachment bracket assembly to attach the cutter tube member to motive equipment to drive the cutter tube member through soil.

6. The apparatus of claim 1, further comprising:
a scraper attached to at least one of the cutter tube member or the injector boot, to push the ejected soil into the void as the cutter tube member is driven through soil.

7. The apparatus of claim 1, further comprising:
motive equipment unitarily integrated with the cutter tube member, to drive the cutter tube member through soil.

8. The apparatus of claim 1, further comprising:
at least one controllable accessory;
a system to control at least one of the cutter tube member, the injector boot, or the at least one controllable accessory, the system comprising:
at least one of a user interface or sensor to issue inputs; and
a controller to receive inputs from at least one of preprogrammed instructions, the user interface, or a sensor, and communicating instructions to control at least one of the cutter tube member, the injector boot, or the at least one controllable accessory, in response to the inputs received by the controller.

9. The apparatus of claim 8, wherein at least one sensor is a location-determining receiver to determine a position of the apparatus.

10. The apparatus of claim 8, wherein at least the cutter gibe member is controlled to produce the void with at least one of a desired grade, depth or slope.

11. An apparatus, comprising:
a cutter tube member to excavate soil, the cutter tube member comprising:
an intake section having a free end with an intake to receive soil;
an ejector section connected to the intake section, the ejector section having a free end with an ejector port;
a passage extending through the intake section and ejector section, the passage extending substantially continuously from the intake to the ejector port; and
a plow positioned above the intake section;
wherein driving the cutter tube member through soil, with the free end of the intake section leading, forces soil into the intake and through the passage toward the ejector port, leaving a void in the soil;
one or more ducts in fluid communication with the passage, to receive and inject a fluid into the passage, the injected fluid at least partially fluidizing the soil forced through the passage, at least one of the one or more ducts extending through the plow and into the intake section.

12. The apparatus of claim 11, further comprising:
an injector boot attached to the cutter tube member,
the injector boot comprising:
a tube-like channel extending through the injector boot, the channel having a first end with a feed port to receive at least one of media or backfill material, and a second end with a discharge opening to release the at least one of the media or backfill material into the void.

13. The apparatus of claim 11, further comprising:
a shaker connected to the cutter tube member, to impart a dynamic vibration force to the cutter tube member.

14. The apparatus of claim 11, further comprising:
at least one auger disposed in the passage, to cleave soil entering the intake, and driving soil through the passage.

15. The apparatus of claim 11, further comprising:
motive equipment to drive the cutter tube member through soil.

16. The apparatus of claim 15, further comprising:
a scraper attached to at least one of the cutter tube member or the injector boot, to push excavated soil into the void as the cutter tube member is driven through soil.

17. The apparatus of claim 12, further comprising:
a control system, to control at least one of the cutter tube member or the injector boot.

18. A method, comprising:
driving a cutter tube member through soil, the cutter tube member having an intake, an ejector port, and a passage extending substantially continuously from the intake to the ejector port, whereby soil enters the intake and is forced into the passage toward the ejector port, and is ejected from the cutter tube member through the ejector port, leaving a void in the soil through which the cutter tube member has been driven;

injecting a fluid into the passage at an inlet positioned downstream of the intake as the soil is forced therethrough, whereby the soil is at least partially fluidized to facilitate the movement of the soil through the passage; and applying a dynamic vibration force to the cutter tube member.

19. The method of claim 18, wherein, soil entering the intake is broken up by a guard member.

20. The method of claim 18, further comprising:

moving an injector boot behind the cutter tube member as the cutter tube member is driven through soil, the injector boot having a tube-like channel extending through the injector boot, the channel having a first end with a feed port to receive at least one of media or backfill material, and a second end with a discharge opening to release at least one of the media or backfill material into the void; and receiving the at least one of the media or the backfill material and releasing the media or backfill material into the void.

21. The method of claim 18, wherein, motive equipment is unitarily integrated with the cutter tube member to drive the cutter tube member.

22. The method of claim 18, further comprising:

breaking up and driving soil through the passage with at least one auger within the cutter tube member.

* * * * *